United States Patent

Sultan et al.

[11] Patent Number: 6,166,120
[45] Date of Patent: Dec. 26, 2000

[54] FLAME RETARDANT COMPOSITION

[75] Inventors: Bernt-Åke Sultan, Ödsmål, Sweden; Matti Hirvensalo, Espoo; Jussi Laurell, Porvoo, both of Finland

[73] Assignee: Borealis Technology Oy, Porvoo, Finland

[21] Appl. No.: 09/262,372

[22] Filed: Mar. 4, 1999

Related U.S. Application Data

[63] Continuation of application No. PCT/SE97/01561, Sep. 16, 1997.

[30] Foreign Application Priority Data

Sep. 17, 1996 [SE] Sweden .................................. 9603371

[51] Int. Cl.$^7$ ...................................................... C08K 3/26
[52] U.S. Cl. .......................... 524/425; 524/481; 524/433; 524/413; 525/479
[58] Field of Search ..................... 524/481, 433, 524/413, 425; 525/479

[56] References Cited

U.S. PATENT DOCUMENTS 5,002,996  3/1991  Okuda et al. ........................... 524/436
5,234,360  8/1993  Kramer, Jr. .............................. 439/505

FOREIGN PATENT DOCUMENTS

334205 A2   9/1989  European Pat. Off. .
0393959 A2  10/1990  European Pat. Off. .
WO 98/12253  3/1998  WIPO .

OTHER PUBLICATIONS

Encyclopedia of Polymer Science and Engineering, vol. 7, edited by Mark et al., John Wiley & Sons, p. 551, 1987.

*Primary Examiner*—Robert Dawson
*Assistant Examiner*—Kuo-Liang Peng
*Attorney, Agent, or Firm*—Merchant & Gould P.C.

[57] ABSTRACT

The present invention relates to a flame retardant composition comprising (A) a polymer which includes a copolymer of ethylene and at least one other comonomer including a vinyl unsaturated polybishydrocarbylsiloxane; and (B) an inorganic filler comprising at least one member selected from the group consisting of oxides, hydroxides and carbonates of aluminium, magnesium, calcium and barium. It also relates to a cable or wire comprising such a composition.

10 Claims, No Drawings

FLAME RETARDANT COMPOSITION

This application is a Continuation of International Application Serial No. PCT/SE97/01561, filed Sep. 16, 1997.

The present invention relates to a flame retardant composition and to a cable or wire having a layer comprising such a flame retardant composition.

It is known to use flame retardant compositions containing halides.

It is also known to increase the flame retardancy of polymer compositions by incorporating into the compositions relatively large amounts, typically 50 to 60% by weight, of inorganic fillers which decompose endothermically liberating an inert gas at a temperature in the range of 200 to 600° C. In the 1970s use of aluminium hydroxide Al(OH)$_3$ was prevalent. In the 1990s use of Mg(OH)$_2$ became more frequent. Also CaCO$_3$ has been used for the same purposes.

Flame retardant additive systems which use silicone fluids have also been proposed for use in polyolefin compositions. For example EP 0 393 959 discloses a flame retardant polymer composition comprising (A) an organic polymer, at least 40% by weight of which is a copolymer of ethylene with one or more comonomers selected from the group consisting of C$_1$ to C$_6$ alkyl acrylates, C$_1$ to C$_6$ alkyl methacrylates, acrylic acid, methacrylic acid and vinyl acetate, (B) a silicone fluid or gum, and (C) an inorganic filler which is a compound of a metal of Group II A of the Periodic Table of Elements (on the inside cover of Perry et al "Chemical Engineers' Handbook" 5th edition 1973), but which is neither a hydroxide nor a substantially hydrated compound.

A disadvantage with the flame retardant compositions containing halides is that on combustion they release halide containing compounds which are harmful to the environment.

A disadvantage with the known silicone containing compositions is that silicone gum is generally in the form of lumps, which are difficult to handle. In order to render it fluid it must be pre-heated and pumped. Further, admixed silicone gum has a tendency to migrate in the composition during extrusion, which may give rise to depositions, so-called die drool, on equipment such as dies used in the process. It also clogs the embossing wheels used for applying identification marks on cables. Besides, silicone gum constitutes an extra component, the handling of which entails longer processing times and higher costs.

According to the present invention the above mentioned disadvantages are alleviated or eliminated by a flame retardant composition comprising a copolymer which as a monomer includes a silicon-containing compound. Thus, instead of being mixed with the polymer of the flame retardant composition, the silicon-containing compound is polymerised into the polymer and forms an integral part thereof. Besides preventing die drool, this also results in a composition with fewer components than in the known compositions, and this constitutes yet another advantage and leads to a better homogeneity of the composition.

Another advantage with the composition according to the invention is the fact that less silicone compound is needed in the new composition compared to the known compositions.

Thus, the present invention relates to a flame-retardant composition comprising:
(A) a polymer which includes a copolymer of ethylene and at least one other comonomer including a vinyl unsaturated polybishydrocarbylsiloxane according to formula (I):

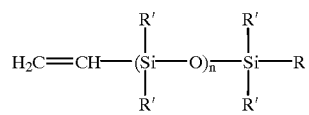

wherein n=1–1000, and R and R', independently, are vinyl; alkyl, branched or unbranched, with 1–10 carbon atoms; aryl with 6 or 10 carbon atoms; alkylaryl with 7–10 carbon atoms; or arylalkyl with 7–10 carbon atoms (preferred due to its commercial availability is vinyl polydimethylsiloxane); and (B) an inorganic filler comprising at least one member selected from the group consisting of oxides, hydroxides and carbonates of aluminium, magnesium, calcium and barium.

It also relates to manufactured items containing such a composition and in particular to a cable or wire having a layer comprising such a flame retardant composition.

The characterising features of the invention will be evident from the following description and the appended claims.

Despite the fact that the siloxane according to the invention is polymerised, and thus bonded, a surprisingly good Limiting Oxygen Index (LOI) value is achieved; it is considerably higher than for a composition not comprising any silicone and of the same magnitude as LOI values for compositions comprising similar amounts of silicone gum mixed with a polymer.

The Limiting Oxygen Index (LOI), according to ISO 4589-A-IV, is a measurement of a products flame resistance. To determine the LOI-value a test specimen of the compound to be evaluated is ignited in an atmosphere of a mixture of nitrogen and oxygen. The content of oxygen in the N$_2$/O$_2$ mixture is gradually decreased until the specimen stops burning. The percentage of O$_2$ in that N$_2$/O$_2$ mixture constitutes the compound's LOI-value. A high LOI-value means that a high percentage of oxygen is needed to sustain combustion, i.e. the compound has a good flame resistance. The LOI-value for a flame retardant composition should be at least 22, and higher values are desirable.

As indicated above, the polymer containing the vinyl unsaturated polybishydrocarbylsiloxane monomer of formula (I) is a copolymer of ethylene and the monomer of formula (I), optionally with one or more additional comonomers. These additional comonomers are preferably selected from the group consisting of C$_1$–C$_6$ alkyl acrylates, C$_1$–C$_6$ alkyl methacrylates, acrylic acid, methacrylic acid, vinyl acetate, vinyl trimethoxysilane and vinyl triethoxysilane.

In this connection it should be noted that the term "copolymer" as used herein includes graft copolymers in which one or more of the comonomers is grafted onto the polymer backbone.

The above polymer including the monomer of formula (I) preferably comprises at least 40%, more preferably at least 60% by weight of the polymer of the flame retardant composition.

In addition to the above defined ethylene copolymer the composition according to the present invention may also include other, admixed polyolefins such as, for example, homopolymers and copolymers of ethylene, propylene and butene and polymers of butadiene or isoprene. Suitable homopolymers and copolymers of ethylene include low density polyethylene, linear low, medium or high density polyethylene, and very low density polyethylene. Other suitable polymers include polyesters, polyethers and polyurethanes. Elastomeric polymers may also be used such as, for example, ethylene-propylene rubber (EPR), ethylene-propylene-diene monomer rubbers (EPDM), thermo-plastic elastomer rubber (TPE) and acrylonitrile butadiene rubber (NBR). Silane-crosslinkable polymers may also be used i.e. polymers prepared using unsaturated silane monomers having hydrolysable groups capable of crosslinking by hydrolysis and condensation to form silanol groups in the presence of water and, optionally, a silanol condensation catalyst. The silane-crosslinkable polymer can be for example a copolymer of ethylene and an unsaturated silane monomer, such as vinyl trialkoxysilane, produced by copolymerising the monomers in a polymerisation reactor or by grafting the silane monomer onto a polyethylene backbone.

The amount of vinyl polybishydrocarbylsiloxane in the composition according to the present invention is approximately 0.01–30% by weight, preferably 1–10% by weight and more preferably 3–7% by weight.

The inorganic fillers suitable for use in the flame retardant composition according to the present invention are oxides, hydroxides and carbonates of aluminium, magnesium, calcium and/or barium. Examples of suitable inorganic fillers are calcium carbonate, magnesium oxide and huntite $Mg_3Ca(CO_3)_4$.

The amount of inorganic filler in the composition according to the invention is 10–70% by weight, and preferably 15–45% by weight.

In addition to the polymer and inorganic filler, the compositions according to the present invention may contain additional ingredients such as, for example, anti-oxidants and small amounts of other conventional polymer additives.

Suitable amounts of the components in the flame retardant composition according to the invention are specified above. However, it will be apparent to a person skilled in the art that the proportions to be used should be selected to give the required balance of properties, in particular to give balance between the flame retardancy and the physical properties of the composition.

The flame retardant compositions according to the present invention are suitable for use in, for example, cables such as installation cables and flexible cables, pipes, tubes, hoses, electrical contacts etc.

The invention is further illustrated by the following example, which in no way should be construed to limit the scope of the invention.

EXAMPLE

The flame retardant composition according to the present invention was compared to known flame retardant compositions. The compounds used in this example were mixed in a Brabender cokneader at 160° C. resulting in compounds comprising known compositions as well as a compound comprising the composition according to the invention and, finally, a compound containing no silicone. The evaluation of their LOI-values was performed, as described above, after milling the extrudate and moulding the resulting granulate into 3 mm thick sheets.

The compounds and the LOI-values are shown in table 1.

Compound 1 comprises only calcium carbonate as a flame retardant substance and no silicone. Compound 2 and compound 3 both comprise a flame retardant composition according to the present invention. Compounds 4–6 comprise different known flame retardant compositions.

The polymer in the flame retardant composition according to the invention in examples 2 and 3 was a tar-polymer of ethylene, vinyl unsaturated polydimethyl-siloxane and butyl acrylate.

The known flame retardant composition comprised mixtures of silicone gum with an ethylene-ethyl acrylate co-polymer and different inorganic flame retardant additives.

TABLE 1

| Component | Compound 1 | Compound 2 | Compound 3 | Compound 4 | Compound 5 | Compound 6 |
|---|---|---|---|---|---|---|
| $CaCO_3$[1] | 30% | | 30% | | | 30% |
| $Mg(OH)_2$[2] | | 30% | | 30% | | |
| $Mg(OH)_2$[3] | | | | | 30% | |
| E/Si/BA-terpolymer[4] | | 69.8% | 69.8% | | | |
| Silicone gum | | | | 5% | 5% | 5% |
| EEA[5] | 69.8% | | | 64.8% | 64.8% | 64.8% |
| IB-215 (Irganox, stabiliser) | 0.2% | 0.2% | 0.2% | 0.2% | 0.2% | 0.2% |
| Density | | 1.17 g/cm³ | 1.17 g/cm³ | 1.18 g/cm³ | 1.18 g/cm³ | 1.15 g/cm³ |
| LOI | 20.8 | 30.6 | 29.6 | 39.2 | 35.2 | 37.0 |

[1]Omya EX-H1 SP
[2]Kisuma 5J from Kyowa Chemicals
[3]FR 20 MHRM 105 from Dead Sea Bromine
[4]Ethylene terpolymer containing 14% BA and 3.6% vinyl polydimethylsiloxane; n in formula (I) is 100
[5]EEA = Ethylene/ethyl acrylate copolymer with 15.3% EA (grade OE5810 from Borealis)

The LOI-values obtained for the Compounds 2 and 3 according to the invention were markedly better than that of Compound 1 containing no silicone, but somewhat lower than those of the compounds containing a mixture EEA and silicone gum. It has to be remarked though that the total amount of siloxane in compounds 2 and 3 was 2.5%, i.e. only half of that in compounds 4–6, which contained 5% silicone gum. By increasing the siloxane content in the compositions according to the invention a higher LOI-value may be obtained.

We claim:

1. A flame retardant composition comprising:
   (A) a polymer which includes a copolymer of ethylene and at least one other comonomer including a vinyl unsaturated polybishydrocarbylsiloxane according to formula (I):

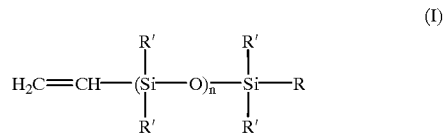

(I)

wherein n=1–1000, and R and R', independently, are vinyl; alkyl, branched or unbranched with 1–10 carbon atoms; aryl with 6 or 10 carbon atoms; alkylaryl with 7–10 carbon atoms; or arylalkyl with 7–10 carbon atoms; and (B) an inorganic filler comprising at least one member selected from the group consisting of oxides, hydroxides and carbonates of aluminium, magnesium, calcium and barium.

2. A flame retardant composition according to claim 1, wherein the copolymer includes at least one further comonomer selected from the group consisting of $C_1$–$C_6$ alkyl acrylates, $C_1$–$C_6$ alkyl methacrylates, acrylic acid, methacrylic acid and vinyl acetate.

3. A flame retardant composition according to claim 2, wherein the copolymer including the vinyl unsaturated polybishydrocarbylsiloxane comonomer constitutes at least 40% by weight of the polymer part of the total composition.

4. A flame retardant composition according to claim 1, wherein the amount of vinyl polybishydrocarbylsiloxane comonomer is approximately 0.01–30% based on the weight of the total composition.

5. A flame retardant composition according to claim 1, wherein the amount of vinyl polybishydrocarbylsiloxane comonomer is approximately 1–10% based on the weight of the total composition.

6. A flame retardant composition according to claim 1, wherein the amount of vinyl polybishydrocarbylsiloxane comonomer is 3–7% based on the weight of the total composition.

7. A flame retardant composition according to claim 1, wherein the amount of inorganic filler is approximately 10–70% based on the weight of the total composition.

8. A flame retardant composition according to claim 1, wherein the amount of inorganic filler is approximately 15–45% based on the weight of the total composition.

9. A flame retardant composition according to claim 1, wherein the polymer includes a copolymer of ethylene, a vinyl unsaturated polydimethylsiloxane according to formula (I), and butyl acrylate.

10. A cable or wire having a layer comprising a flame retardant composition according to claim 1.

* * * * *